United States Patent
Spariosu et al.

(10) Patent No.: US 7,860,142 B2
(45) Date of Patent: Dec. 28, 2010

(54) LASER WITH SPECTRAL CONVERTER

(75) Inventors: Kalin Spariosu, Thousand Oaks, CA (US); Alexander A. Betin, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 282 days.

(21) Appl. No.: 11/349,016

(22) Filed: Feb. 7, 2006

(65) Prior Publication Data

US 2007/0183474 A1    Aug. 9, 2007

(51) Int. Cl.
*H01S 3/091* (2006.01)
(52) U.S. Cl. .......................................... 372/79; 372/78
(58) Field of Classification Search ............... 372/79, 372/70
See application file for complete search history.

(56) References Cited

U.S. PATENT DOCUMENTS

| | | | |
|---|---|---|---|
| 5,402,434 A * | 3/1995 | Manako et al. ............... 372/41 |
| 6,738,396 B2 * | 5/2004 | Filgas et al. .................. 372/19 |
| 2002/0018632 A1 * | 2/2002 | Pelka ........................ 385/130 |
| 2005/0111805 A1 * | 5/2005 | Hertz et al. ................ 385/125 |
| 2007/0242713 A1 | 10/2007 | Spariosu et al. | |

* cited by examiner

*Primary Examiner*—Tod T Van Roy
*Assistant Examiner*—Patrick Stafford
(74) *Attorney, Agent, or Firm*—Pillsbury Winthrop Shaw Pittman LLP

(57) ABSTRACT

A laser with a spectral converter. The novel laser includes a spectral converter adapted to absorb electromagnetic energy in a first frequency band and re-emit energy in a second frequency band, and a laser gain medium adapted to absorb the re-emitted energy and output laser energy. The spectral converter includes a plurality of quantum dots having an emission spectrum matching an absorption spectrum of the gain medium. In an illustrative embodiment, the spectral converter is adapted to convert broadband energy to narrowband energy, and the gain medium is a REI-doped solid-state laser gain medium.

18 Claims, 6 Drawing Sheets

LASER WITH SPECTRAL CONVERTER

BACKGROUND OF THE INVENTION

1. Field of the Invention

The present invention relates to optical systems. More specifically, the present invention relates to lasers.

2. Description of Related Art

The implementation of compact transmitters ranging from flash ladar active sensors to high energy weapon-class laser systems is currently limited to large platforms due to the relatively low power per weight ratio numbers in the present approaches. Efficient diode laser pumped solid-state lasers have pushed the wall-plug efficiency to levels exceeding 25% and have scaled to multi-kilowatt powers in inherently compact systems for sensor transmitters and—ultimately—directed energy weapon implementation. Practical utility of diode-pumped lasers is still limited, however, by the need for extensive sophisticated thermal management infrastructures which add to the complexity, weight, and power of the overall laser system. This becomes especially important for space-borne and airborne platforms where weight-volume envelopes need to be kept to a minimum. In addition, certain laser waveforms (such as high peak power—short pulse and low duty cycle) are not at all suited for diode pumping; however, the alternate flash lamp pumping approach is very inefficient in conventional lasers.

Flash lamp pumped lasers are widely used in today's industrial, medical and research laser systems. These lasers, however, are inherently inefficient because of the poor spectral overlap between the flash-lamp spectral emission and the absorption bands of REI (rare earth ion) doped insulating crystal hosts (such as $Nd^{3+}$, $Yb^{3+}$, $Er^{3+}$, etc. in crystals, glass, polymers, etc.). Although efficient integrating pump cavities have been employed in order to bring the efficiencies of Nd:YAG lasers to as high as 3-4%, the significant waste heat loading in these lasers in addition to the poor efficiency prevents them from being scaled to compact high energy waveforms within compact architectures/geometries.

Sunlight pumped lasers have been studied and demonstrated; however, they also utilize conventional REI-doped insulating crystal hosts/gain media and therefore have limited efficiency due to the poor spectral overlap of the sun's blackbody emission and the relatively narrow absorption bands of REI ions.

Semiconductor (SC) lasers can be more efficient than REI-based lasers, but typically are not suitable for high energy/power scaling. Recent work on optically pumped semiconductor lasers and amplifiers in addition to optically pumped quantum dots (QDs) shows promise for directly pumped SC-based lasers. However, due to the extremely high saturation intensities of SC lasers, they are typically limited to micron-scale waveguide geometries and are not scalable to practical bulk high energy laser geometries.

Hence, a need exists in the art for an improved compact, lightweight laser that is scalable for high energy and power, and that offers higher efficiency than conventional approaches.

SUMMARY OF THE INVENTION

The need in the art is addressed by the laser of the present invention. The novel laser includes a spectral converter adapted to absorb electromagnetic energy in a first frequency band and re-emit energy in a second frequency band, and a laser gain medium adapted to absorb the re-emitted energy and output laser energy. The spectral converter includes a plurality of quantum dots having an emission spectrum matching an absorption spectrum of the gain medium. In an illustrative embodiment, the spectral converter is adapted to convert broadband energy to narrowband energy, and the gain medium is a REI-doped solid-state laser gain medium.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

As discussed above, REI (rare earth ion) based laser gain media are much more amenable to high energy/power scaling than semiconductor-based lasers. However, REIs typically have narrow absorption bands that limit efficient operation to diode pumping. Diode pump sources, however, are expensive and typically require sophisticated thermal management infrastructures which add to the complexity, weight, and power of the overall laser system.

In accordance with the teachings of the present invention, an intermediary quantum dot (QD) activated material is used to convert broadband pump light to narrowband radiation, which can then be used to excite a REI-doped gain medium.

Optically pumped QD lasers using QDs as the laser gain medium have been studied and demonstrated in the prior art. Quantum dots are fabricated from semiconductor material in a geometry such that a quantum confinement exists in all three dimensions, resulting in an emission spectra having a discrete number of states. Quantum dot lasers, however, typically require extremely high saturation intensities because of their short exciton lifetimes (electron-hole recombination times). At best, the exciton lifetimes are on the order of several nanoseconds, such that very high waveguide confinement is needed for efficient laser action. Instead of using QDs as the gain medium, the present invention uses QDs as a spectral converter.

Figure 1:
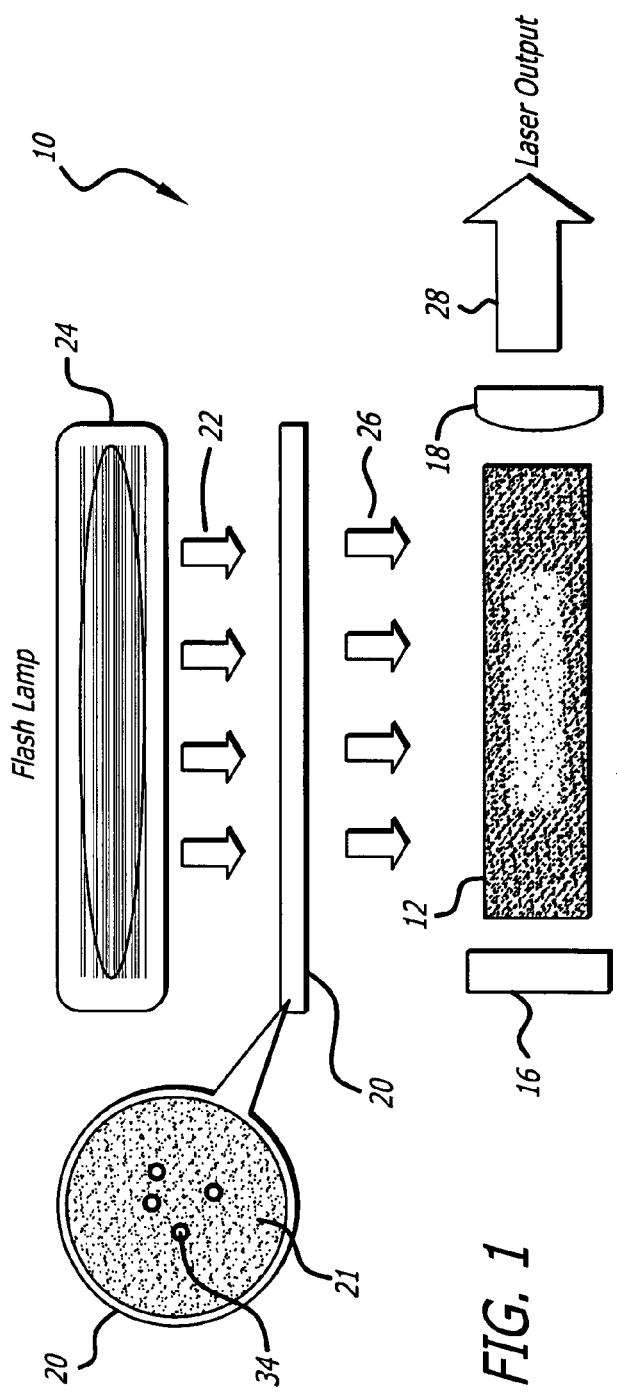
FIG. 1 is a simplified schematic of an illustrative embodiment of a laser designed in accordance with the teachings of the present invention.

FIG. 1 is a simplified schematic of an illustrative embodiment of a laser 10 designed in accordance with the teachings of the present invention. The laser 10 includes a gain medium 12 disposed in a resonator formed by a mirror 16 and an output coupler 18 (a partially reflective mirror), and a spectral converter 20. The spectral converter 20 is adapted to absorb broadband light 22 from a pump source 24, such as a flash lamp, arc lamp, or the sun, and emit narrowband energy 26 to excite the gain medium 12 and generate a laser output 28. In accordance with the teachings of the present invention, the spectral converter 20 is fabricated from QD activated (doped) material, and includes a plurality of quantum dots 34 dispersed throughout a host material 21. The host material 21 may be any suitable material that is optically transparent at the absorption and emission frequencies of the quantum dots. In the illustrative embodiment, the gain medium 12 is a REI-doped solid-state laser gain medium. The invention, however, is not limited thereto. Other types of gain media, including liquid or gas, can also be used without departing from the scope of the present teachings.

Figure 2B:
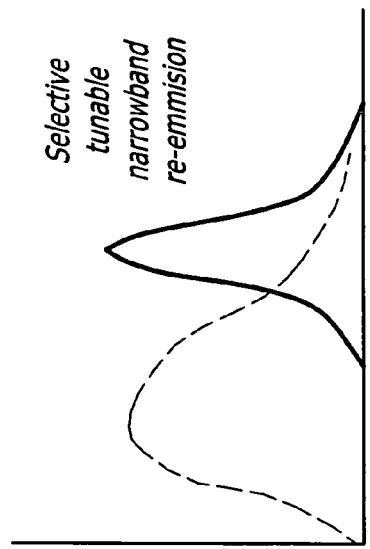
FIG. 2b is a graph of power vs. wavelength of the tunable narrowband re-emission of an illustrative spectral converter designed in accordance with the present teachings.
Figure 2A:
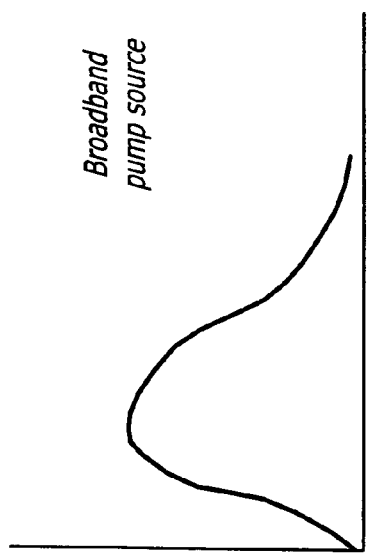
FIG. 2a is a graph of power vs. wavelength of an illustrative broadband source.

FIG. 2a is a graph of power vs. wavelength of an illustrative broadband source 24, and FIG. 2b is a graph of power vs. wavelength of the tunable narrowband re-emission 26 of an illustrative spectral converter 20 designed in accordance with the present teachings.

Figure 3:
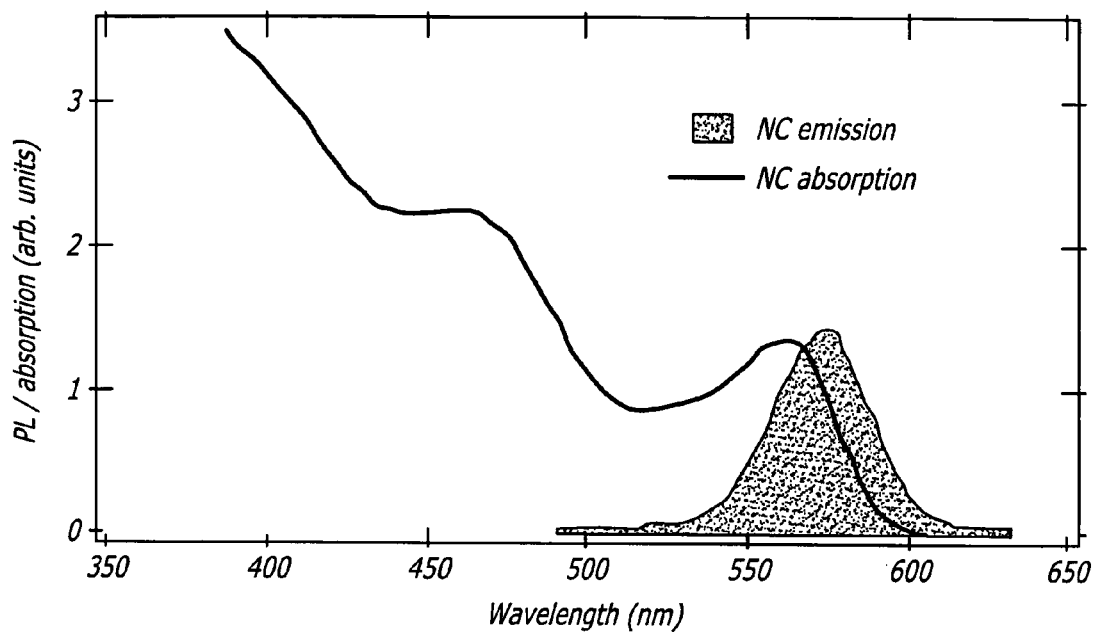
FIG. 3 is a graph showing illustrative quantum dot absorption and emission spectra.

FIG. 3 is a graph showing illustrative quantum dot absorption and emission spectra. As shown in the graph, QDs have broadband absorption spectra, but emit narrowband energy. QDs are therefore well suited to efficiently convert broadband energy into narrowband radiation. The QD-activated medium efficiently absorbs nearly 100% of the broadband pump light and re-emits the radiation with 80% quantum yield the energy into a narrow band. This narrowband emission can be tuned to match the RFI absorption band(s) of the gain medium (and may include multiple bands) during the QD fabrication process through design considerations such as semiconductor material and geometries.

The quantum dots should be evenly (homogeneously) dispersed through the intermediary spectral transformer layer to provide for the efficient absorption of broadband light and re-emission (radiatively) spectrally matched to the REI absorption band(s). Subsequent lasing should occur with efficiencies comparable to diode-pumped operation from the REI ions. The waste heat generation due to the quantum defect is burdened to the intermediary layer, not the lasing medium so that performance similar to diode-dumped lasers is expected.

Figure 4:
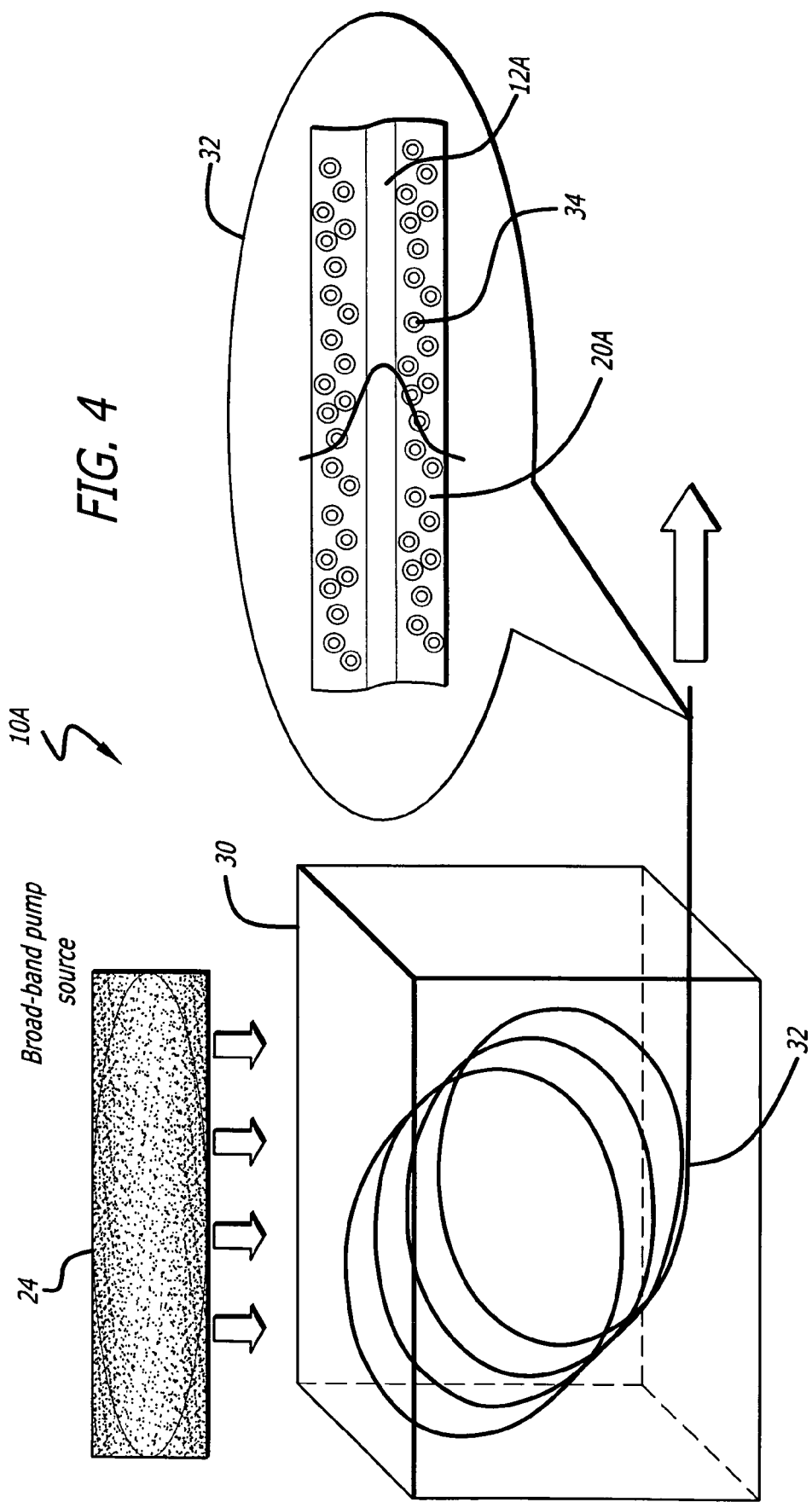
FIG. 4 is a simplified schematic of an illustrative optical fiber implementation of a laser designed in accordance with the teachings of the present invention.

FIG. 4 is a simplified schematic of an illustrative optical fiber implementation of a laser 10A designed in accordance with the teachings of the present invention. In this embodiment, a QD spectral converter layer is disposed around the laser gain medium. Specifically, FIG. 4 shows a fiber laser 10A including a broadband pump source 24 that radiates broadband energy into an integrating pump cavity 30, where it is absorbed by an optical fiber 32. The fiber, which can be fabricated via sol-gel synthesis, includes a laser gain medium core 12A having a QD activated cladding 20A. Thus, the cladding of the fiber 32 is activated with quantum dots 34, and spectrally transforms the broadband radiation from the pump source 24 to narrow resonant emission, which then pumps the laser gain core 12A of the fiber 32.

The key difference in this geometry is that the cladding 20A of the fiber 32 is activated with a QD spectral energy transforming medium. This QD-activated cladding 20A provides for an efficient clad-pumped inner core laser gain medium. In this way the scattering losses are not an issue as the gain medium itself is not QD-activated but is rather pumped via the QD-activated intermediate (in this case inner cladding fiber geometry) layer.

TABLE 1

| Material System (Composition) | Type | Emmission Peak [nm] | Emmission Peak Tolerance | Typical FWHM [nm] | Crystal Diamter [nm-approx.] |
|---|---|---|---|---|---|
| CdTe/CdS | Core-Shell | 660 | +/−10 | 30 | 4.3 |
| CdTe/CdS | Core-Shell | 680 | +/−10 | 30 | 4.8 |
| PbS | Core | 850 | +/−50 | 80 | |
| PbS | Core | 950 | +/−50 | 80 | |
| PbSe | Core | 1200 | +/−100 | 180 | 4.5 |
| PbSe | Core | 1400 | +/−100 | 180 | 5 |
| PbSe | Core | 1630 | +/−100 | 180 | 5.5 |

Figure 5A:
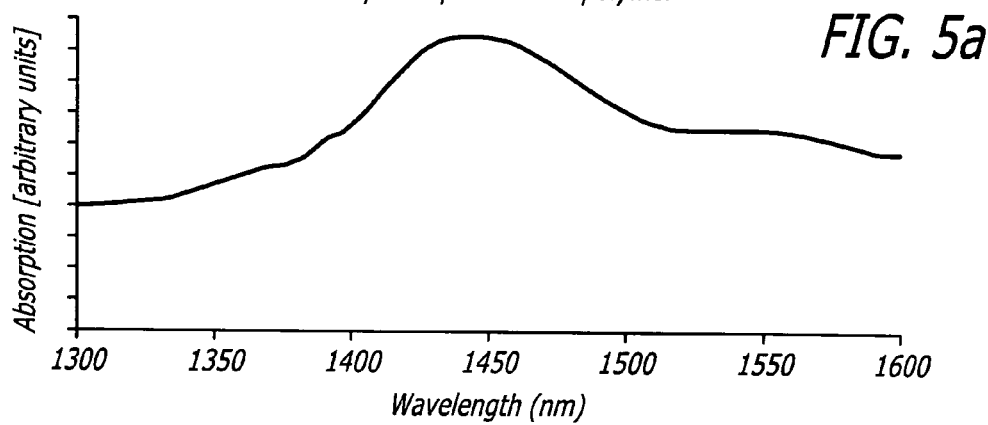
FIG. 5a is a graph showing the absorption spectrum of Er:polymer.
Figure 5B:
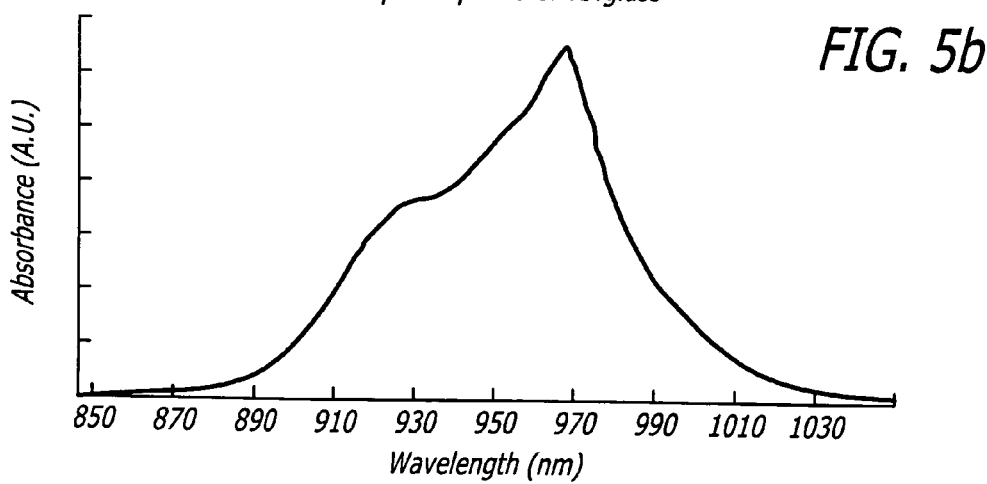
FIG. 5b is a graph showing the absorption spectrum of Yb:glass.

Table 1 shows typical QD performance at different wavelength regions. Although the QD re-emission band gets broader with increasing wavelength, even lasers that are pumped near 1500 nm can have efficient absorption. For example, Er:polymer and Yb:glass absorption spectra have excellent matches to the QD emission bandwidths. FIGS. 5a and 5b are graphs showing the absorption spectra of Er:polymer and Yb:glass, respectively.

Quantum yield (QY) is measured with respect to a fluorescent dye standard. Fluorescent dye has an absorption maxima relatively close to the emission peak so that in a dye there is relatively little energy loss due to the change in input vs. output photons (typically a dye will exhibit QYs of >90%). QYs as high as 80% can be achieved in QD structures. The major nonradiative recombination route is through interband states caused by defects typically at the QD surface. The QD synthesis process as well as the addition of semiconductor shells can reduce defects and hence increase QY.

Figure 6:
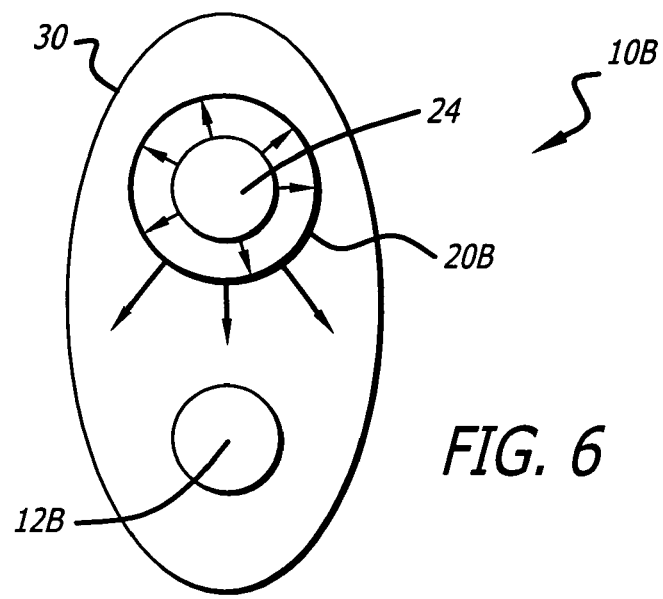
FIG. 6 is an end view of another illustrative embodiment of a laser designed in accordance with the teachings of the present invention.

FIG. 6 is an end view of another illustrative embodiment of a laser 10B designed in accordance with the teachings of the present invention. In this implementation, a QD-based sleeve or coating 20B is disposed around the pump source 24, which resides in an integrating pump cavity 30 with the laser gain medium 12B (a laser rod is shown in this example).

It should be noted that another implementation of the QD spectral-transformer in a flash-lamp pumped integrating laser cavity is to have the cooling fluid itself be "doped" with, an optimized QD volume such that the cooling fluid acts as the spectral transformer while also doubling as the thermal management for the laser rod.

The QD volume required for efficient absorption and re-emission of a pulse of emitted light energy from a flash lamp can be estimated as follows. It is known that the spectral power emission for a flash lamp can be approximated well with the blackbody function. In fact, in typical flash lamps driven with current densities in the range 2-5 kA/cm² for efficient operation, the spectral emission follows the blackbody functions with temperature ranges of 7000-10000 K. The blackbody energy density both in terms of frequency and wavelength is given by:

$$\rho(v) = \frac{8\pi v^2}{c^3} \frac{hv}{e^{\frac{hv}{kT}} - 1} \quad [1]$$

$$\rho(\lambda) = \frac{8\pi hc}{\lambda^5} \frac{1}{e^{\frac{hv}{kT}} - 1} \quad [2]$$

The intensity [W/cm²] emitted from a blackbody (within frequency range $v_2$-$v_1$) can be written as:

$$\sigma T^4 = \frac{c}{4} \int_0^\infty \rho(v) dv \cong \frac{c}{4} \int_{v_1}^{v_2} \rho(v) dv \quad [3]$$

for a large spectral interval $v_2$-$v_1$, where $\sigma$=5.67×10$^{-8}$ [Wm$^-$$^2$K$^{-4}$] and T is the temperature in [K]. The energy [J] emitted by a blackbody of surface area, $A_{bb}$ is then:

$$E_{bb} = A_{bb} \tau_{fp} \frac{c}{4} \int_{v_1}^{v_2} \rho(v) dv \quad [4]$$

where $\tau_{fp}$ is the duration (pulse time) of the emission.

Figure 7:
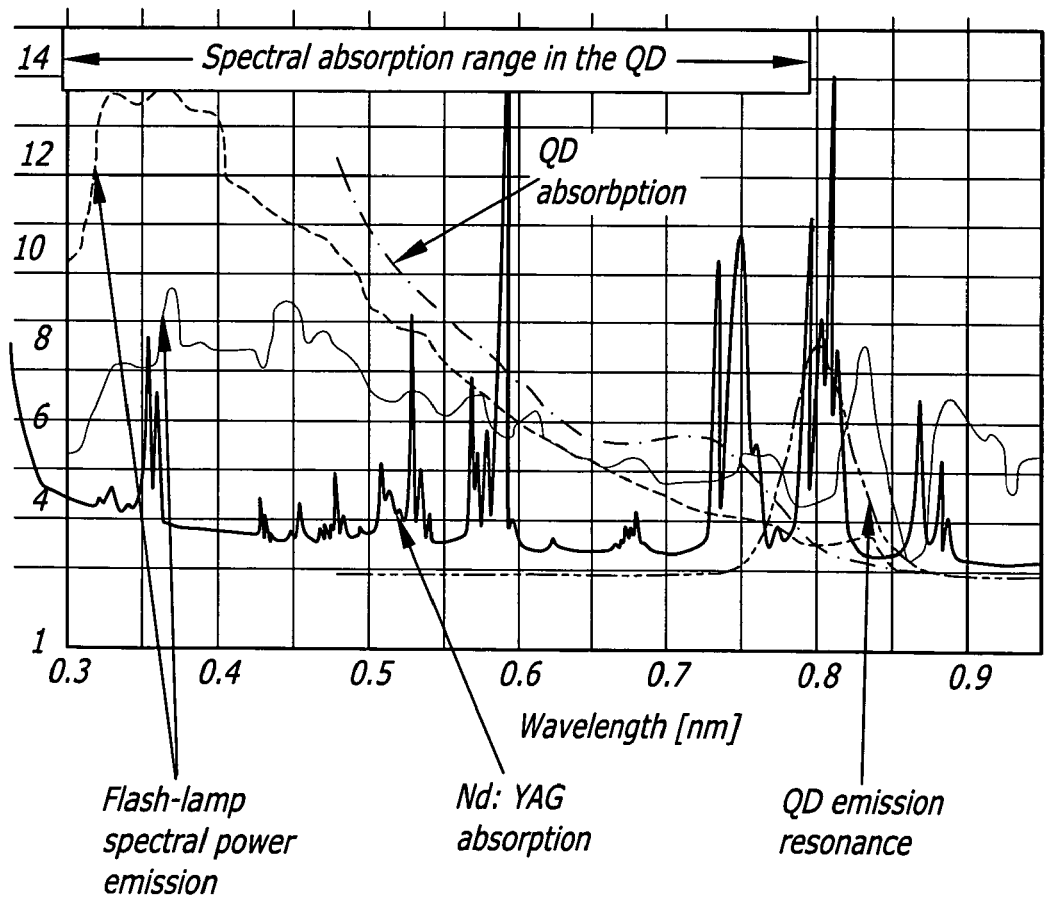
FIG. 7 is a graph of illustrative flash lamp emission, QD absorption/emission, and Nd:YAG absorption showing spectral overlap.

FIG. 7 is a graph of flash lamp emission, QD absorption/emission, and Nd:YAG absorption showing spectral overlap for an example scenario where the absorption of the flash lamp black body radiation is up to the center emission wavelength (the resonance emission peak of the QD).

For a Nd:YAG laser system with a QD structure that has an emission resonance at 800 nm (where efficient excitation of Nd:YAG lasers has been demonstrated with diode lasers emitting near that wavelength), the energy/power conversion efficiency (of the QD), not taking into account the quantum efficiency (or the quantum yield), can be written as:

$$\eta_{co} = \frac{hv_{800nm} \int_{v_{800mn}}^{v_2} \frac{\rho(v)}{hv} dv}{\int_{v_{800nm}}^{v_2} \rho(v) dv} \quad [5]$$

That is, calculate the integrated number of photons and then multiply by the photon energy corresponding to the 800 nm wavelength resonance peak. This is then divided by the total integrated energy of the blackbody emission where in both cases the integration was up to the cut-off wavelength of 800 nm. This is the best case scenario where only the quantum defect—driven efficiency is compared with the usable (absorbed) radiation. In the other extreme, divide by the total emission over the entire spectrum, as given by:

$$\eta_t = \frac{\frac{c}{4} hv_{800nm} \int_{v_{800mn}}^{v_2} \frac{\rho(v)}{hv} dv}{\sigma T^4} \quad [6]$$

Figure 8:
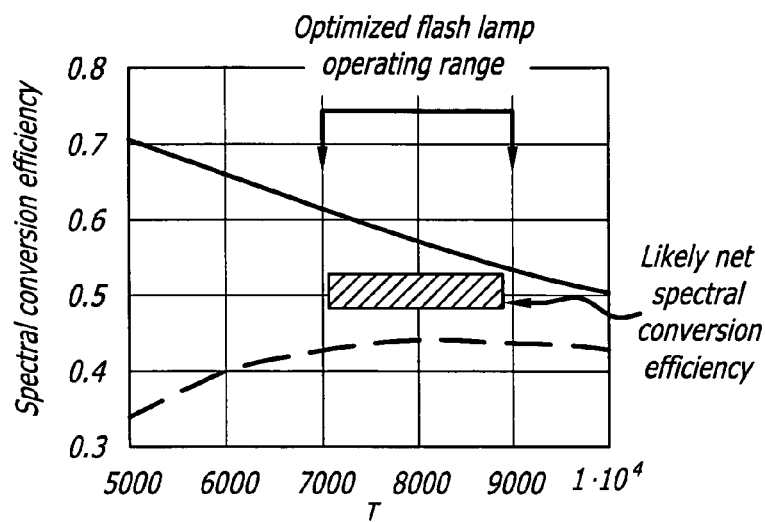
FIG. 8 is a graph of illustrative spectral power conversion efficiency of QD emitters as a function of black body (flash-lamp plasma) temperature.

FIG. 8 is a graph of the spectral power conversion efficiency of QD emitters as a function of black, body (flashlamp plasma) temperature. The dashed curve represents absolute efficiency over the entire spectrum and the solid curve represents the efficiency with respect to only absorbed light.

In integrating pump cavities, it is known that some of the radiation that is not absorbed by the laser rod gets re-absorbed by the emitting plasma—thereby reconverting a portion of that back into light. In the case of conventional flash lamp pumped lasers where a very poor spectral overlap exists, this incremental efficiency boost is very poor, but in the QD-activated spectral converter approach of the present invention, the excellent spectral overlap can make the process a lot more efficient. Hence, the true spectral efficiency for this particular scenario lies somewhere in between the two curves shown in FIG. 8 and is likely to be as high as 50%. If this efficiency is then weighed by the quantum yield which can be as high as 80%, an overall optical conversion efficiency of a QD—activated spectral converter based flash-lamp pumped laser can be anticipated to be as high as 40%.

Another way to look at the spectral efficiency predictions is by calculating a mean frequency of the blackbody emitter and then simply calculating the quantum defect from the QD resonant emission frequency corresponding to the 800 nm emission wavelength. That is, the quantum defect for a particular temperature can be written as:

$$\eta_{QD} = \frac{v_{800nm}}{\frac{\int_{v_{800nm}}^{v_2} \left[\frac{\rho(v)}{v}\right] v dv}{\int_{v_{800nm}}^{v_2} \left[\frac{\rho(v)}{v}\right] v dv}} \quad [7]$$

As expected, this result matches with the result of Eqn. 14.

Consider a special case of an Nd:YAG laser pumped with this approach. A typical flash lamp is 10 cm long with a 2 mm diameter active plasma volume (with an outside glass enclosure diameter of ~5 mm). The spectrally integrated energy emitted by the flashlight (assuming for the moment near 100% electrical to optical conversion) is ~14.6 J, in a 100 microsecond pulse duration of roughly 0.55×$\tau_F$—which is the upper laser state fluorescence lifetime. With a roughly 3% conversion efficiency, a conventional flash lamp pumped Nd:YAG laser would emit ~0.5 J which is typical for this size/geometry configuration. With the 40% spectral conversion efficiency of the QD-active layer, the energy emitted at 800 nm by the QD-active volume would be ~6.4 J. The laser output energy is then estimated to be ~$\eta_{QD}\eta_\alpha\eta_{bo}$×6.4.J=2.7 J. This example assumed typical (conservative) values of: i) Nd:YAG quantum defect efficiency, $\eta_{QD}$=0.75—for 800 nm pumped 1 μm laser action, ii) absorption efficiency, $\eta_\alpha$=0.8, iii) mode overlap efficiency, $\eta_{bo}$=0.7. Given these conditions, more than 6× higher overall efficiency as compared to conventional flash lamp pumping may be achieved.

An additional benefit of this approach and—just as important—is that the laser medium should see the thermal load similar to a diode pumped system since the thermal load due to the conversion effective quantum defect will be subtended by the QD volume and not the lasing medium. In this way, one not only gets the advantage of a vastly improved efficiency, but also provides for an excellent beam quality since the waste heat is drastically reduced in the laser gain medium.

The following calculations estimate the volume and the number of QDs required for efficient spectral absorption—conversion. Given the configuration of an external sleeve having a radius, $R_s$, and a thickness, $t_s$, surrounding the flash lamp the attenuation coefficient requirement can be written as:

$$1 - e^{31\, \epsilon_A M t_s} \approx 0.95 \qquad [8]$$

for at least 95% absorption across the QD layer thickness (single pass), which translates to:

$$\epsilon_A M t_s \sim 3 \qquad [9]$$

from the molar attenuation coefficient, the absorption cross-section is derived as:

$$\sigma_A = [cm^2] = \frac{\varepsilon_A \left[\frac{liter}{cm*mol}\right] * 1000 \left[\frac{cm^3}{liter}\right]}{N_A \left[\frac{1}{mol}\right]} \qquad [10]$$

The QD material best suited for 800 nm excitation of Nd:YAG from Table 1 is PbS, which has a molar absorption coefficient at least as large as $2.5 \times 10^5$ [cm$^{-1}$M$^{-1}$]. This translates to an absorption cross-section of $4.15 \times 10^{-16}$ [cm$^2$].

The volume of the QD mass in terms of the QD number, $N_{QD}$, inside a sleeve volume, $V_s$, can be expressed as:

$$V_{QD} = N_{QD} \frac{4}{3}\pi R_{QD}^3 = \frac{4}{3}\pi R_{QD}^3 \frac{3V_s}{\sigma_A t_s} \qquad [11]$$

where the volume of the individual QD is:

$$V_{qd} = \frac{4}{3}\pi R_{QD}^3 \qquad [12]$$

$V_s$ is the volume of the sleeve defined in terms of the outside sleeve radius, $R_s$, as given by:

$$V_s = \pi L_{fl}(R_s^2 - (R_s - t_s)^2) \qquad [13]$$

where $L_{fl}$ is the length of the flash lamp active plasma emitting region. The ratio of the QD volume and the sleeve volume will then determine the QD sphere packing density in the activated sleeve:

$$R_V = \frac{V_{QD}}{V_S} = \frac{4\pi R_{QD}^3}{\sigma_A t_s} \qquad [14]$$

Figure 9:
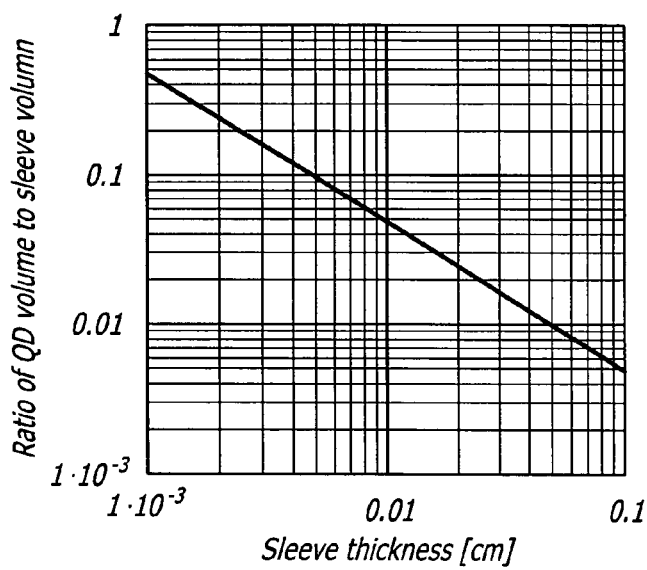
FIG. 9 is a graph of the ratio of the QD volume and the sleeve volume as a function of sleeve thickness.

FIG. 9 is a graph showing the ratio of the QD volume and sleeve volume as a function of sleeve thickness. As shown in the graph, for a nominal 1% doping, an ideal sleeve thickness should be about 0.5 mm. (This assumes 95% single pass absorption.)

The number of spheres for a 10 cm long flash-lamp active region should be:

$$N_{QD} = \frac{3\pi L_{fl}(2R_s - t_s)}{\sigma_A} \qquad [15]$$

The optimum number of quantum dots would therefore be $2.16 \times 10^{17}$, $4.43 \times 10^{17}$, and $6.7 \times 10^{17}$ for outside sleeve radii of 0.5 cm, 1 cm, and 1.5 cm, respectively (all with 500 micron sleeve thickness). For a nominal energy emitted by the flash lamp, $E_{fl}$, within a pulse, the expression for the intensity on the sleeve/cylinder can be written as:

$$I_{fl} = \frac{E_{fl}}{\tau_{flp} 2\pi R_s L_{fl}} \qquad [16]$$

The absorption saturation intensity is given by:

$$I_{sat} = \frac{h\nu_{mean}}{\sigma_A \tau_D} \qquad [17]$$

where the mean flash-lamp emission frequency, $\nu_{mean}$, is defined in Eqn. 5.

Figure 10:
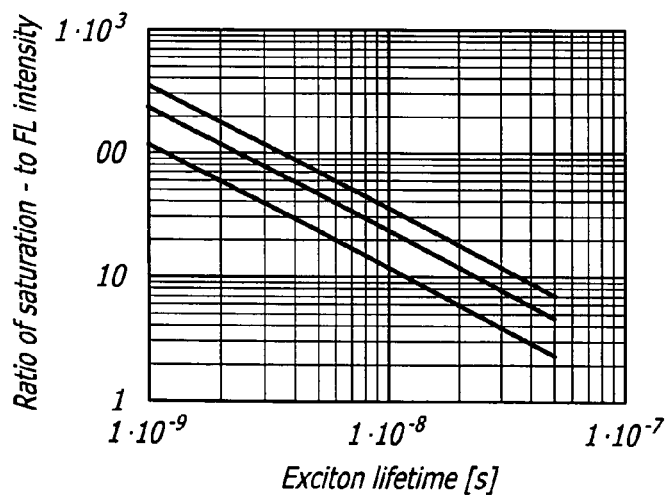
FIG. 10 is a graph showing the ratio of the saturation intensity to the flash lamp intensity on the QD sleeve as a function of the exciton lifetime.

FIG. 10 is a graph showing the-ratio of the saturation intensity to the flash lamp intensity on the QD sleeve as a function of the exciton lifetime, for three different sleeve diameters (0.5 cm, 1 cm, 1.5 cm). These results re plotted for the nominal case of 14.6 J energy emission in a 100 microsecond long pulse.

Another method to analyze the energy capacity of the QD absorbing volume is to consider the number of absorption/re-emission cycles that each one of the QDs in the QD sleeve volume can undergo within the duration of the pump pulse. The total energy capacity that the QD volume can sustain is given by:

$$E_{tot} = N_{QD} h\nu_{mean} \frac{\tau_{flp}}{\xi \tau_D} \qquad [18]$$

The factor, $\xi$, must be $\xi > 1$ because the statistical lifetime, $\tau_D$, definition is at the 1/e intensity point: $\xi = (1/e^{-1}) = 2.7$. There is in perfect agreement with the, results of Eqn. 18 when $\xi = 2.7$:

$$\frac{E_{tot}}{E_{fl}} = \frac{I_{sat}}{I_{fl}} \qquad [19]$$

Therefore, it can be concluded that for a nominal 3 ns QD exciton lifetime the capacity of a thin QD-based spectral converter can easily exceed several hundred Joules and can therefore be utilized as an efficient spectral energy converter for multi-J class flash lamp pumped lasers.

Returning to the general estimates of the blackbody conversion efficiency estimates for the common laser gain media, first, note that the recent demonstration of efficient multiple exciton generation (MEG) can boost the spectral conversion efficiency significantly. This entails the process of impact ionization (II) where the formation of multiple e-h pairs per absorbed photon can result in multiple exciton generation. In bulk semiconductors (SC) the photon energy for II exceeds that required for energy conservation alone because crystal momentum has to be conserved. In addition, the rate of II must compete with rate of energy relaxation by phonon-electron scattering, a very fast (<ps) process. In QDs, electron-phonon interactions are significantly reduced due to discrete e-h spectra. Therefore, the inverse Auger (II) is greatly enhanced due to carrier confinement. Also, crystal momentum need not be conserved in 3D QWs. The single and multiple exciton states are coherently coupled, whereas Auger recombination rates are much slower. Thus, the irreversibility between the coherent and incoherent regimes allows high quantum yields for MEG. QDs in the strong confinement regime exhibit sparse electronic states with inter-level spacing that is several times the optical phonon energy. However, in many SC QDs the conduction band energy level spacing is much greater than the valence band spacing due to the smaller electron effective mass. For $m_e^* \ll m_h^*$ Auger cooling provides a relaxation route to bypass the phonon bottleneck. In PbS and PbSe, e and h effective masses are relatively small and essentially identical: Auger like process is inhibited.

The generalized efficiency equations for the single exciton and MEG processes (in-band relative comparison) are given as:

$$\eta_{SE} = \frac{h\nu_{pump} \int_{\nu_{lower}}^{\nu_{upper}} \frac{\rho(v)}{h\nu} dv}{\int_{\nu_{lower}}^{\nu_{upper}} \rho(v) dv} \quad [20]$$

for the single exciton process, where the $\nu_{pump}$ is the resonant pump band frequency, and for the MEG:

$$\eta_{ME} = \frac{h\nu_{pump} \left\{ \begin{array}{l} \int_{\nu_{pump}}^{2\nu_{pump}} \frac{\rho(v)}{h\nu} dv + \\ 2\int_{2\nu_{pump}}^{3\nu_{pump}} \frac{\rho(v)}{h\nu} dv + \\ 3\int_{3\nu_{pump}}^{4\nu_{pump}} \frac{\rho(v)}{h\nu} dv \end{array} \right\}}{\int_{\nu_{lower}}^{\nu_{upper}} \rho(v) dv} \quad [21]$$

The spectral integral is such that $\nu_{lower}$ is chosen to correspond to $\nu_{pump}$ whereas $\nu_{upper}$=2 $\nu_{lase}$, 3 $\nu_{lase}$, or near the frequency corresponding to 300 nm—whichever is larger. The similar expressions for the overall efficiency—relative to the entire BB spectral emission are:

$$\eta_{SEoverall} = \frac{\frac{c}{4} \nu_{pump} \int_{\nu_{lower}}^{\nu_{upper}} \frac{\rho(v)}{v} dv}{\sigma T^4} \quad [22]$$

$$\eta_{ME0} = \frac{\frac{c}{4} \nu_{pump} \left\{ \begin{array}{l} \int_{\nu_{pump}}^{2\nu_{pump}} \frac{\rho(v)}{v} dv + \\ 2\int_{2\nu_{pump}}^{3\nu_{pump}} \frac{\rho(v)}{v} dv + \\ 3\int_{3\nu_{pump}}^{4\nu_{pump}} \frac{\rho(v)}{v} dv \end{array} \right\}}{\sigma T^4} \quad [23]$$

Figure 11:
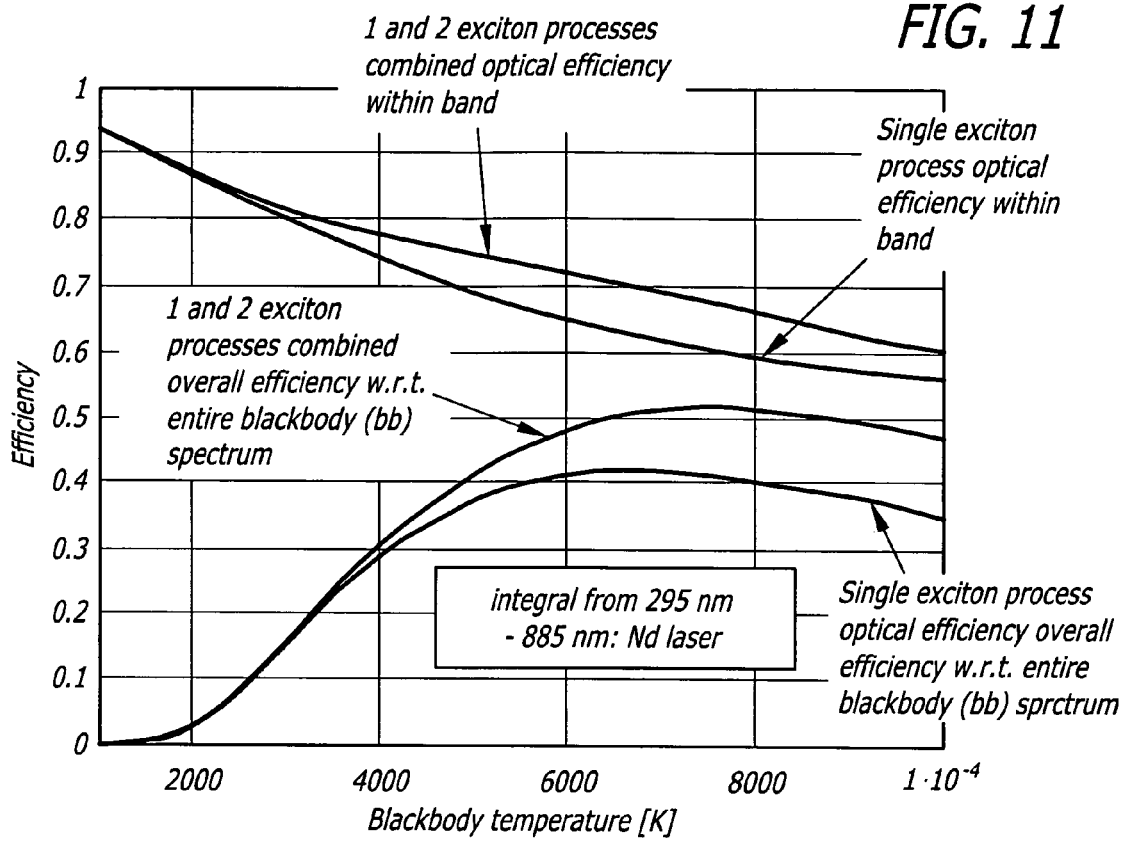
FIG. 11 is a graph showing the predicted efficiencies for an Nd laser system pumped at a 300 nm to 885 nm pump band.
Figure 12:
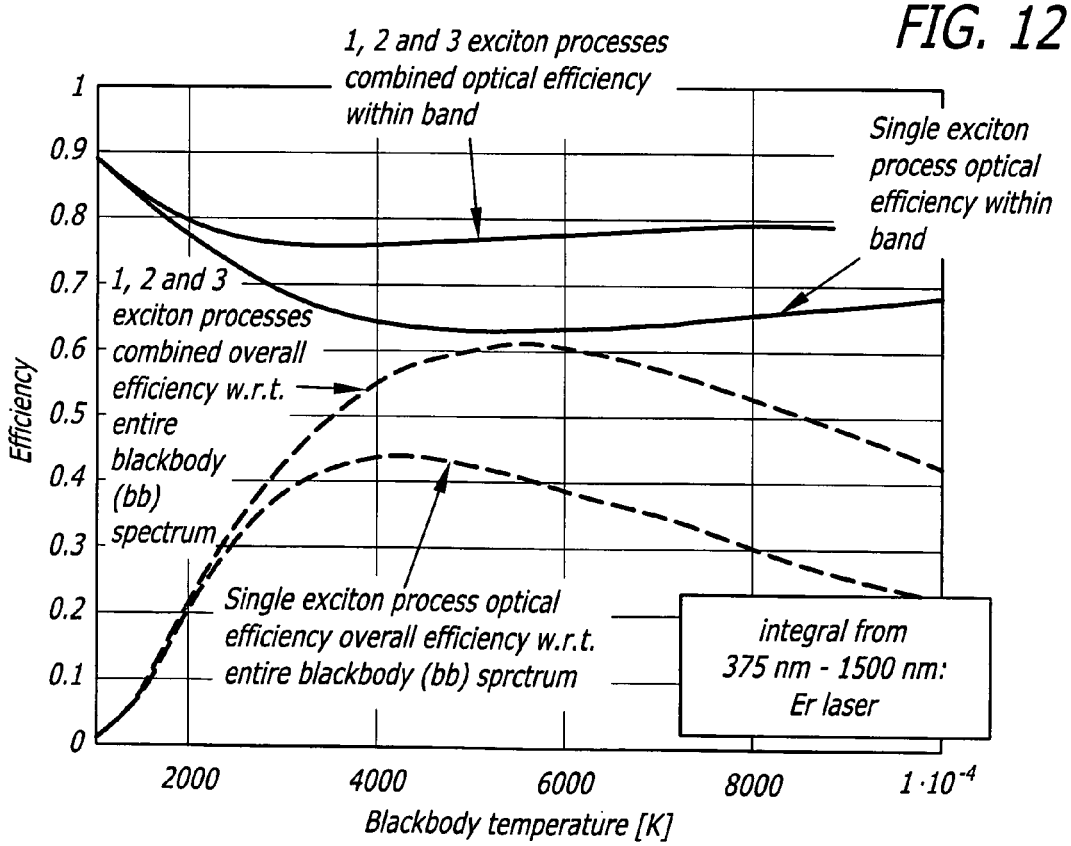
FIG. 12 is a graph showing the predicted efficiencies for an Er laser system pumped at a 375 nm to 1500 nm pump band.

FIG. 11 is a graph showing the predicted efficiencies for an Nd laser system pumped at a 300 nm to 885 nm pump band. Since the spectral integral limit was cut off at 300 nm in this case, the 2 exciton MEG process is the maximum and it shows a yield of 20% efficiency boost. An Yb laser pumped near 940 nm has more or less unchanged predicted efficiency performance. An Er laser system pumped near 1500 nm exhibits a much improved efficiency boost (predicted) because it can encompass the three exciton process while staying within the 300 nm minimum wavelength cutoff. FIG. 12 is a graph showing the predicted efficiencies for an Er laser system pumped at a 375 nm to 1500 nm pump band.

The flash-lamp sleeve based spectral converter can be a polycrystalline sintered powder material based on UV-robust host materials such as $CaF_2$. Or, the sleeve QD-based spectral converter can be in the form of a liquid which is transparent out to 300 nm so that blackening or color center formation is still not an issue in the deployment/implementation of this efficiency boost concept. A liquid solution/colloidal emulsion can in fact double as both the spectral converter for efficiency boost and the cooling fluid for thermally managing the flash-lamp and the laser gain medium.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A laser component, comprising:
 a layer of material adapted to absorb electromagnetic energy in a first frequency band and re-emit energy in a second frequency band; and
 a laser gain medium adapted to absorb said re-emitted energy in said second frequency band and output laser energy in a third frequency band,
 wherein said layer of material includes a plurality of quantum dots.

2. The invention of claim 1 wherein said second frequency band matches an absorption band or bands of said gain medium.

3. The invention of claim 1 wherein said first frequency band is broadband.

4. The invention of claim 1 wherein said material is adapted to absorb solar energy.

5. The invention of claim 1 wherein said gain medium is a REI-doped solid-state laser gain medium.

6. The laser component of claim 1, wherein said quantum dots are homogeneously dispersed throughout said layer.

7. The laser component of claim 1, wherein said laser component is a fiber laser having a laser gain medium core.

8. The laser component of claim 1, wherein said quantum dots are dispersed through a cladding layer disposed around said gain medium core.

9. A laser, comprising:
 a broadband pump source adapted to radiate broadband energy;
 a layer of quantum dot activated material adapted to absorb said broadband energy and re-emit narrowband energy; and
 a laser gain medium adapted to absorb said re-emitted narrowband energy from said quantum dot activated layer and output laser energy.

10. The invention of claim 9 wherein said re-emitted narrowband energy is spectrally matched to an absorption band or bands of said gain-medium.

11. The invention of claim 9 wherein said gain medium is a REI-doped solid-state laser gain medium.

12. The invention of claim 9 wherein said quantum dots are homogeneously dispersed throughout said layer.

13. A laser component comprising;
 a pump cavity;
 a solid-state laser gain medium disposed within said pump cavity; and
 a cooling fluid disposed within said pump cavity and surrounding said gain medium, wherein said fluid is doped with quantum dots adapted to absorb electromagnetic energy in a first frequency band and re-emit energy in a second frequency band that matches an absorption band of said medium.

14. A sun-pumped laser comprising:
 a layer of quantum dot activated material adapted to absorb solar energy in a first frequency band and re-emit energy in a second frequency band and
 a laser gain medium adapted to absorb said re-emitted energy from said quantum dot layer and output laser energy.

15. A method for generating laser energy including the steps of:
 providing a gain medium that absorbs energy in a first frequency band and generates laser output;
 providing a layer including a plurality of quantum dots adapted to absorb energy in a second frequency band and re-emit energy in said first frequency band to said gain medium; and
 illuminating said layer with energy in said second frequency band.

16. The laser component of claim 1, wherein said quantum dots are distributed throughout said layer with density of approximately $$R_V = \frac{4\pi R_{QD}^3}{\sigma_A t_S},$$

where $R_{QD}$ is a radius of said quantum dots, $\sigma_A$ is an absorption cross-section of said quantum dots, and $t_s$ is a thickness of said layer.

17. The laser component of claim 1, wherein said energy emitted from said quantum dots includes energy from a multiple exciton generation process.

18. The laser of claim 9, wherein said layer of quantum dot activated material forms a sleeve around said broadband pump source.

* * * * *